United States Patent [19]
Leonard

[11] Patent Number: 4,877,267
[45] Date of Patent: Oct. 31, 1989

[54] TRUCK MUD FLAP ARM

[76] Inventor: Charles F. Leonard, Rte. 1, Box 99, Star, Id. 83669

[21] Appl. No.: 245,703

[22] Filed: Sep. 15, 1988

[51] Int. Cl.$^4$ .............................................. B12B 9/16
[52] U.S. Cl. ..................................... 280/848; 280/851
[58] Field of Search ............ 280/153 R, 154, 154.5 R; 248/289.1, 204, 145, 475.1, 584, 599; 403/111

[56] References Cited
U.S. PATENT DOCUMENTS

| | | | |
|---|---|---|---|
| 2,652,266 | 9/1953 | Miller | 280/154.5 R |
| 3,224,791 | 12/1965 | Sogoian | 280/154.5 R |
| 3,401,953 | 9/1968 | Prohl et al. | 280/154.5 R |
| 4,189,165 | 2/1980 | Leonard et al. | 280/154.5 R |

*Primary Examiner*—Kenneth R. Rice
*Assistant Examiner*—Richard Camby
*Attorney, Agent, or Firm*—Schroeder, Davis & Orliss Inc.

[57] ABSTRACT

A mud-flap supporting assembly is provided that allows pivotal movement of mounting arm and mud-flap about both the vertical and horizontal axes adjacent to the vehicle to which the arm is attached. A spring connected between the base plate and the end cap of the mounting arm holds said arm in the usual position parallel to the vehicle axle. Should the arm be pushed out of position by an obstruction making contact with the arm, the arm will automatically return to its usual position when the obstruction is passed. Upon return, the base plate's raised portion embeds itself into the exact duplicate negative opening of the mounting arm, and returns the arm precisely to center.

7 Claims, 3 Drawing Sheets

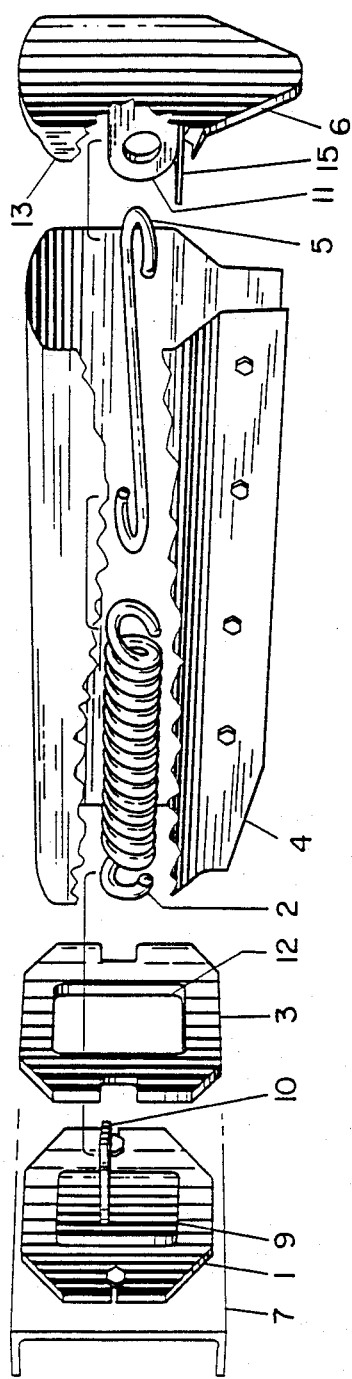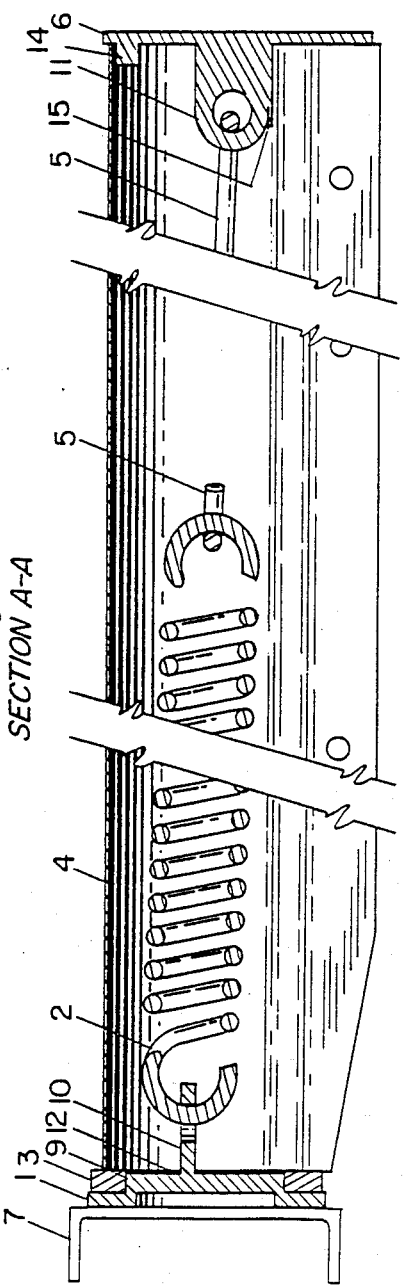

TRUCK MUD FLAP ARM

BACKGROUND OF THE INVENTION

The present invention relates generally to a mud flap mounted behind the rear wheels of a vehicle to prevent mud and the like from being thrown to the rear of the vehicle and, more particularly, to a spring mounted mud flap support arm which is deflectable about a support to prevent damage to the mud flap support arm if the mud-flap or support arm comes into contact with an obstruction.

It is well-known in the prior art to provide deflectably mounted, spring loaded support arms for mounting a mud-flap on a truck or other vehicle. While such structures have in general been quite useful for logging trucks, in highway situations there have been some disadvantages associated with the typical prior art structures. Such prior art structures, as exemplified by U.S. Pat. Nos. 2,652,266 and 2,801,867, have provided for up-and-down movement as well as movement about the vertical axis. When mud or the like builds up on the mud-flaps, however, the prior art support arms tend to droop due to their inability to support additional weight. Therefore the support arms do not maintain a constant vertical relationship with respect to the wheel. Also, there is a tendency in such prior art structures for the flaps to bounce and shake when the vehicle to which they are attached goes over small bumps in the road, which bouncing and shaking under some circumstances can have an effect on the life of the flaps. Additional prior art provided by U.S. Pat. No. 4,352,502 provides for a mounting suitable for highway use which allows movement about the vertical axis but does not allow the arm to yield upward should it be struck by an obstruction from below. Prior art provided by U.S. Pat. No. 3,401,953 and Canadian Patent 846-075 discloses a mud-flap support arm rotatable in any direction from a normally centered position which is of sufficient strength to support a mud encrusted mud flap without drooping whether on a smooth or rough road. There is a possibility of failure, however, due to the return spring being anchored to the thin shell of the arm by a nut and bolt. This arrangement is sufficient for most loads but not for an extraordinarily large one such as may be encountered when the mounting arm is crushed between the vehicle tires and an obstacle.

SUMMARY OF THE INVENTION

The present invention provides a mud-flap support arm rotatably mounted on a base plate rigidly attached to a vehicle and deflectable in any direction from a normal position parallel to the vehicle axle. The support arm includes a spring operable to return the support arm to its normal position when the support arm has been deflected. The mid flap support arm is of sufficient strength to support the weight of the mud-flap with or without the extra burden of mud or whether or not the vehicle operates on a smooth road. A portion on the end of the arm has been devised to be the outside terminus of the return spring contributing immeasurably to the strength and reliability of the arm. Further the added portion includes an end cap which protects the end of the arm from damage, and also protects operators from what previously was the open outside edge of the arm housing. The required spring is of a diameter and length that requires an extension to connect with the endcap. Additionally, by having the mounting arm become one smooth metallic piece of work uninterrupted by a nut and bolt at the mid point, the aesthetics are improved. The present invention provides a mud flap support arm having improved reliability, strength, safety and aesthetics.

BRIEF DESCRIPTION OF THE DRAWINGS

FIG. 2 is a perspective, exploded, cutaway view showing the internal details of the support arm shown in FIG. 1.

FIG. 3 is a side elevation in cross-section taken along line A illustrating the raised portion of the base plate fitting into the end of the mounting arm.

DETAILED DESCRIPTION OF THE PREFERRED EMBODIMENT

Figure 1:
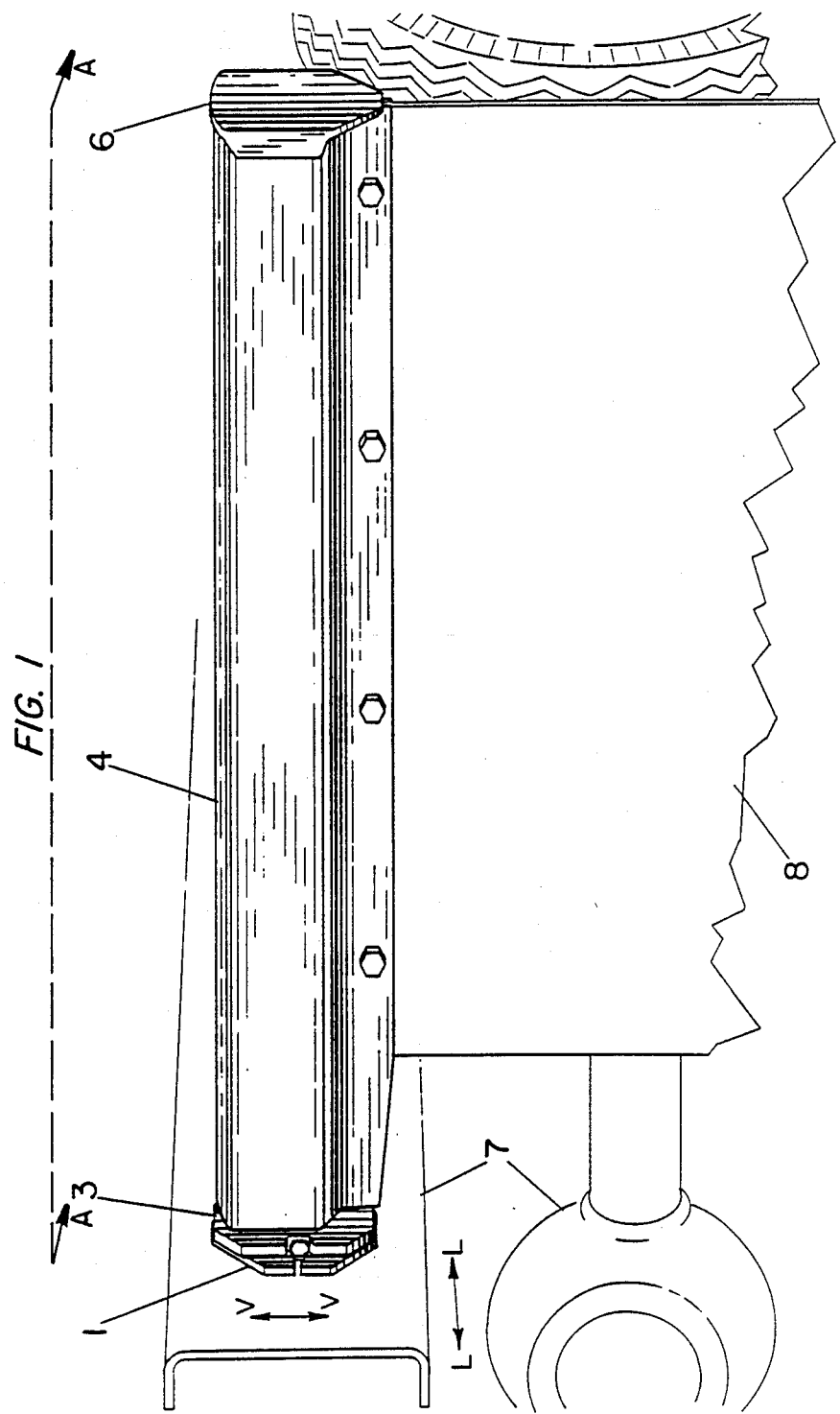
FIG. 1 is a rear elevation of a mud-fap support arm according to the principles of the present invention mounted on the right rear of a vehicle holding a mud-flap in its normal position.

Referring now to FIGS. 1-3, a mud-flap support arm assembly according to the principles of the preseint invention shown in its normal position mounted behind the rear wheels of a vehicle 7. Suspended from the support arm assembly 16 secured thereto by bolts or other suitable means is a truck mud-flap. As shown in FIG. 2 the base plate 1 is permanently attached to the vehicle frame 7 by the use of nuts and bolts 17. The raised platform guide 9 is welded to the base plate 1, and is used in conjunction with the guide opening 12 in the arm end plate 3 to assure that the support arm assembly 16 will remain or return to is normal position. This relationship is clearly shown in FIG. 3. The lug 10 is part of the base plate 1 and is welded to the platform guide 9. The lug 10 receives an end of the return spring 2. The return spring 2 maintains compressive tension to force the support arm assembly 16 onto the base plate 1 guide 9. The end plate 3 is welded to the support arm housing 4, and fits snugly against the base plate 1 aligning itself with the platform guide 9. The return spring 2 is contained within the arm housing 4, and, as mentioned before, connects at one end to the lug 10 on the base plate 1. The opposite end of a spring extension or return spring 2 is hooked into the connector 5 also contained within the support arm housing 4. One end of the connector 5 holds the return spring 2, and the other end of the connector is inserted in a hole provided in a lug 11 which is welded to a support arm housing 4 end cap 6. Four holes are punched in the arm housing 4 for purposes of afixing the mud-flap 8 which is held in place by four nuts and bolts. The end cap 6 is not welded to the support arm housing 4, but is removable and held in the desired position by the use of three devices. Two outside flanges 13 are bent in from the overall pattern of the end cap 6. Remaining outside the support arm housing 4, the flanges 13 prevent movement between the end cap 6 and the support arm housing 4 in the fore and aft direction. The pin 14 welded to the end cap 6, and the guide plate 15 welded to both the lug 11 and the end cap 6 assure that the end cap 6 will remain in vertical alignment with the support arm housing 4 at all times. The mud-flap support arm assembly 16 may be constructed of steel or stainless steel.

OPERATION

Figure 4:
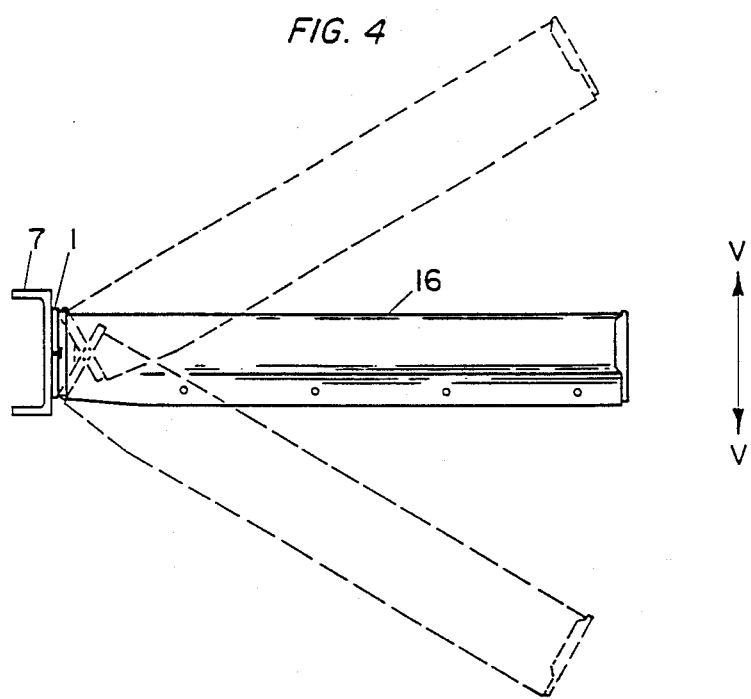
FIG. 4 is a side view illustrating the mounting arm's ability to swivel about the vehicle's vertical axis.
Figure 5:
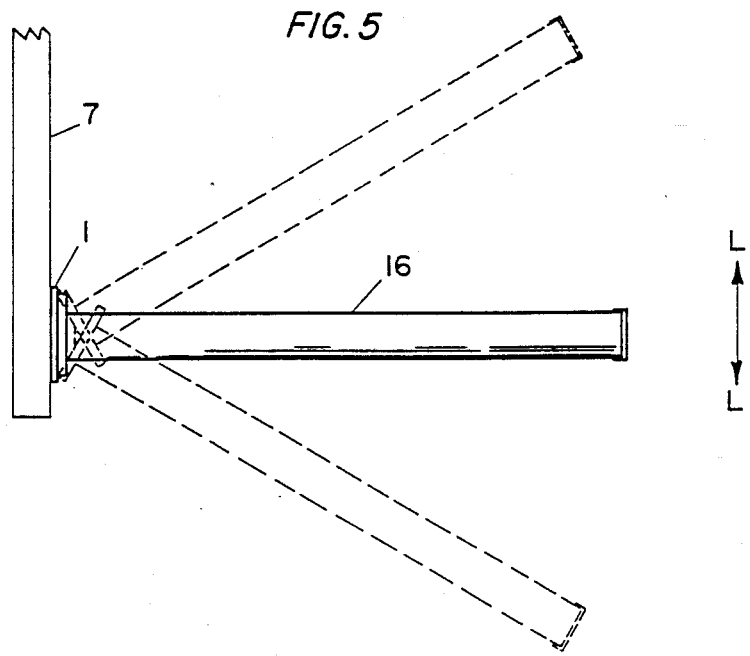
FIG. 5 is a top, plan view illustrating the invention's capability to swivel about the longitudinal axis.

Referring now also to FIGS. 4 and 5, with the base plate 1 bolted to the vehicle 7, and the support arm assembly 16 constructed as described in the previous section, the support arm assembly 16 is designed to rotate in any direction from its normal position as shown in FIGS. 1, 4, and 5. Rotation of the support arm assembly 16 may be caused by contact with an obstacle on the roadway such as a boulder, tree, mound of dirt, or the like. Vertical rotation of the support arm assembly 16 from its normal position is shown in FIG. 4. Longitudinal rotation of the support arm assembly 16 is shown in FIG. 5. When the obstacle is passed, or no longer in a position to exert influence on the support arm assembly 16, the support arm assembly 16 is drawn back to its normal position by the return spring 2, and correct positioning is provided by the guide opening 12 of the support arm end plate 3 fitting precisely over the platform guide 9 which is part of the base plate 1.

I claim:

1. A mud-flap supporting assembly for mounting a mud-flap on a vehicle comprising:

a horizontally oriented, elongated tubular support arm for supporting said mud-flap, said support arm including means for attaching said mud-flap thereto;

a mounting plate for pivotally mounting said support arm at a first end thereof to said vehicle, said mounting plate adapted for providing pivotal movement of said support arm about a vertical and a horizontal axis adjacent said first end, said mounting plate including a first lug and a support platform supporting said first lug;

spring means disposed within said tubular support arm, a first end of said spring means connected to said first lug and a second end of said spring means connected to a second lug fixedly attached to a removable outside end cap disposed at a second end of said support arm, said second lug extending lengthwise into said tubular support arm, said spring means urging said support arm against said mounting plates with sufficient force to retain said support arm in a first position, said spring means allowing said support arm to pivot about said vertical and horizontal axes out of said first position, said spring means urging said pivoted support arm to return to said first position;

an end plate fixedly attached to said first end of said tubular support arm disposed between said tubular support arm and said support plate, said end plate having an aperture formed therein, said spring means extending through said aperture, said end plate having a flat end face portion in abutting engagement with and urged against said support plate by the action of said spring means, said support plate being flat at a major area of engagement with said end plate, said aperture being similar to and encompassing said support platform when said support arm is in said first position, said support plate having edge portions for engaging said end plate during pivoting of said support arm from said first position.

2. A mud-flap supporting assembly as in claim 1 wherein said removable outside end cap includes a guide plate and an alignment pin for maintaining said end cap in vertical alignment against said second end of said tubular support arm, said guide plate and said alignment pin extending lengthwise into said tubular support arm, said removable outside end cap further including a pair of flanges for maintaining horizontal alignment of said removable outside end cap against said second end of said support arm.

3. A mud-flap supporting assembly as in claim 2 wherein said removable outside end cap is urged against and retained in position against said second end of said tubular support arm by the action of said spring means.

4. A mud-flap supporting assembly as in claim 2 wherein said spring means comprises a coil spring and an extension hook, a first end of said coil spring connected to said first lug, a second end of said coil spring connected to said second lug by said extension hook.

5. A mud-flap supporting assembly as in claim 4 wherein said support plate is permanently affixed to said vehicle and said support platform comprises a raised platform for alignment with said support arm and for supporting said first lug.

6. A mud-flap supporting assembly as in claim 1 wherein said means for attaching said mud-flap to said tubular support arm comprises a plurality of bolt and nut assemblies for removable attaching said mud-flap to said tubular support arm.

7. A mud-flap supporting assembly as in claim 1 wherein said mud-flap supporting assembly is constructed of stainless steel.

* * * * *